(12) United States Patent
Wang et al.

(10) Patent No.: US 12,657,765 B2
(45) Date of Patent: Jun. 16, 2026

(54) METHOD FOR HUMAN FALL DETECTION AND METHOD FOR OBTAINING FEATURE EXTRACTION MODEL, AND TERMINAL DEVICE

(71) Applicant: UBTECH ROBOTICS CORP LTD, Shenzhen (CN)

(72) Inventors: Kan Wang, Shenzhen (CN); Shuping Hu, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 369 days.

(21) Appl. No.: 18/380,086

(22) Filed: Oct. 13, 2023

(65) Prior Publication Data

US 2024/0135579 A1 Apr. 25, 2024

(30) Foreign Application Priority Data

Oct. 14, 2022 (CN) ......................... 202211263212.X

(51) Int. Cl.
*G16H 30/40* (2018.01)
*G06N 20/00* (2019.01)
(Continued)

(52) U.S. Cl.
CPC ............ *G06T 7/74* (2017.01); *G06V 10/7715* (2022.01); *G06V 10/774* (2022.01);
(Continued)

(58) Field of Classification Search
CPC ............ G06T 7/74; G06T 2207/20081; G06T 2207/20084; G06T 2207/30196;
(Continued)

(56) References Cited

U.S. PATENT DOCUMENTS

| | | | |
|---|---|---|---|
| 2020/0090484 A1* | 3/2020 | Chen | ........................ G06T 7/50 |
| 2021/0125006 A1* | 4/2021 | Seo | ........................ G06N 3/09 |

(Continued)

FOREIGN PATENT DOCUMENTS

| | | |
|---|---|---|
| CN | 106897390 A | 6/2017 |
| CN | 107103281 A | 8/2017 |

(Continued)

*Primary Examiner* — Amandeep Saini
*Assistant Examiner* — Mehrazul Islam

(57) ABSTRACT

A method for obtaining a feature extraction model, a method for human fall detection and a terminal device are provided. The method for human fall detection includes: inputting a human body image into a feature extraction model for feature extraction to obtain a target image feature; in response to a distance between the target image feature and a pre-stored mean value of standing category image features being greater than or equal to a preset distance threshold, determining that the human body image is a human falling image; and in response to the distance being less than the preset distance threshold, determining that the human body image is a human standing image. The feature extraction model is obtained based on constraint training to aggregate standing category image features and separate falling category image features from the standing category image features.

19 Claims, 7 Drawing Sheets

(a)

(b)

(c)

(51) Int. Cl.

| | |
|---|---|
| *G06T 7/73* | (2017.01) |
| *G06V 10/77* | (2022.01) |
| *G06V 10/774* | (2022.01) |
| *G06V 10/776* | (2022.01) |
| *G06V 10/82* | (2022.01) |
| *G06V 40/10* | (2022.01) |
| *G16H 50/20* | (2018.01) |
| *G06V 20/52* | (2022.01) |

(52) U.S. Cl.
CPC ............ *G06V 10/776* (2022.01); *G06V 10/82* (2022.01); *G06V 40/10* (2022.01); *G06T 2207/20081* (2013.01); *G06T 2207/20084* (2013.01); *G06T 2207/30196* (2013.01); *G06V 20/52* (2022.01)

(58) Field of Classification Search
CPC ............. G06V 10/7715; G06V 10/774; G06V 10/776; G06V 10/82; G06V 40/10; G06V 20/52; G06V 40/103; G06V 20/41; G06V 20/46; G06N 3/08
See application file for complete search history.

(56) References Cited

U.S. PATENT DOCUMENTS

| | | | | |
|---|---|---|---|---|
| 2022/0092366 A1* | 3/2022 | Chiu | .................... | G06N 3/0464 |
| 2022/0386898 A1* | 12/2022 | Ostadabbas | ............ | G06V 20/52 |

FOREIGN PATENT DOCUMENTS

| | | | |
|---|---|---|---|
| CN | 108090456 A | | 5/2018 |
| CN | 109784182 A | * | 5/2019 |

* cited by examiner (a)        (b)        (c)

(a)        (b)

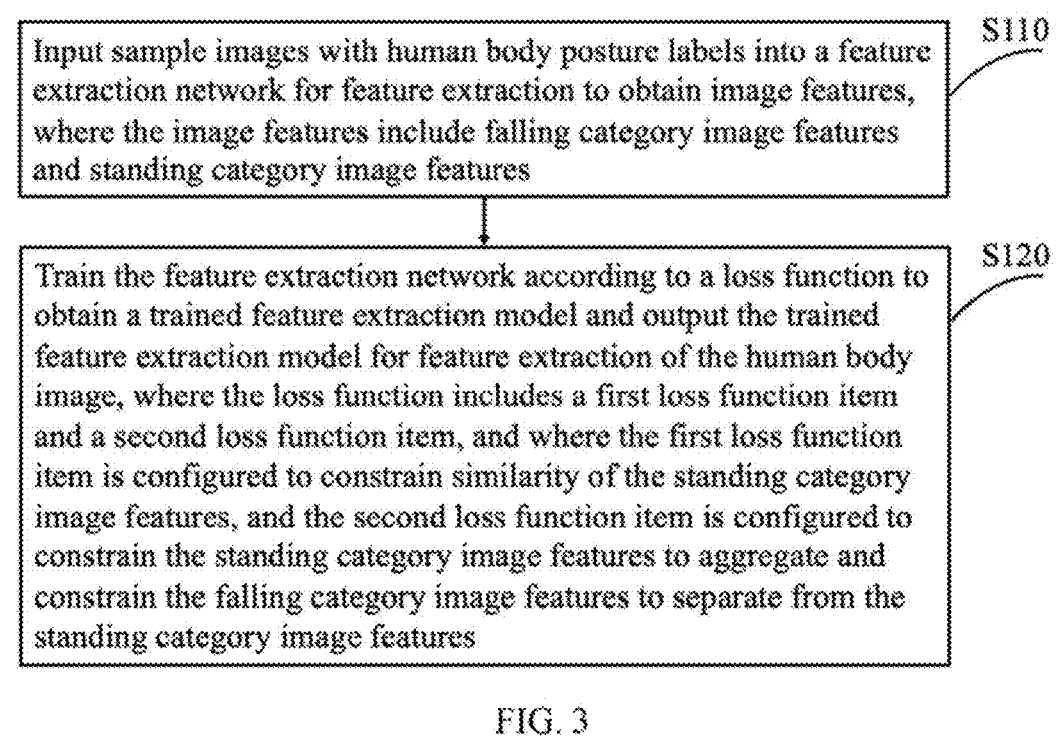

Input sample images with human body posture labels into a feature extraction network for feature extraction to obtain image features, where the image features include falling category image features and standing category image features — S110

Train the feature extraction network according to a loss function to obtain a trained feature extraction model and output the trained feature extraction model for feature extraction of the human body image, where the loss function includes a first loss function item and a second loss function item, and where the first loss function item is configured to constrain similarity of the standing category image features, and the second loss function item is configured to constrain the standing category image features to aggregate and constrain the falling category image features to separate from the standing category image features — S120

FIG. 3

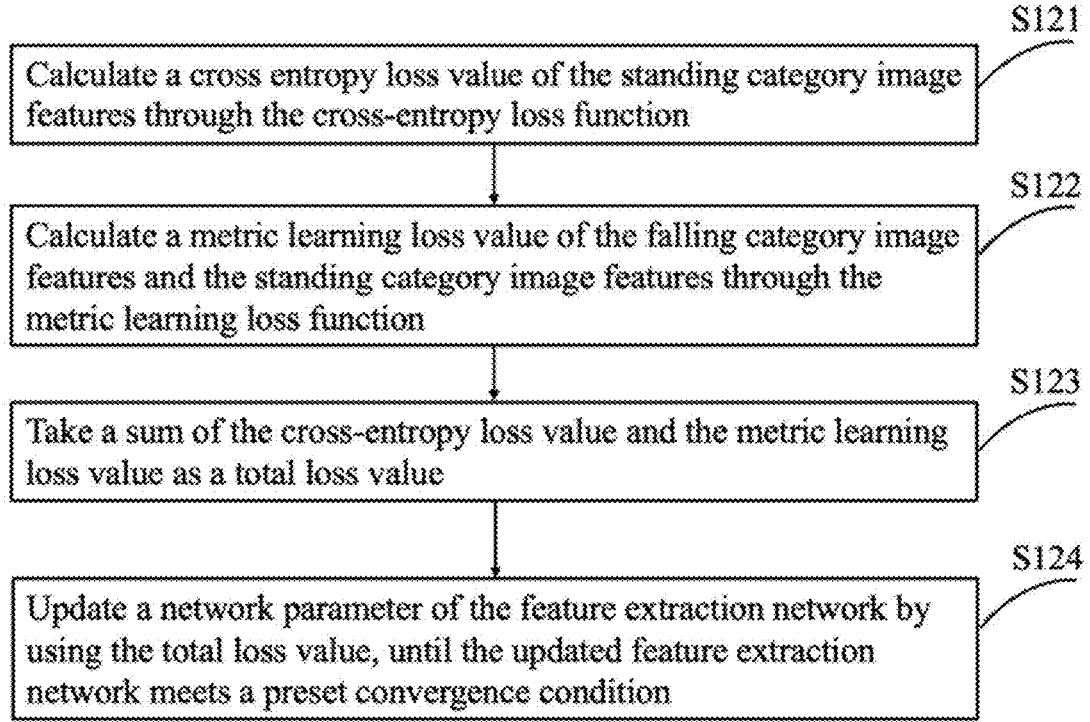

S121

Calculate a cross entropy loss value of the standing category image features through the cross-entropy loss function

S122

Calculate a metric learning loss value of the falling category image features and the standing category image features through the metric learning loss function

S123

Take a sum of the cross-entropy loss value and the metric learning loss value as a total loss value

S124

Update a network parameter of the feature extraction network by using the total loss value, until the updated feature extraction network meets a preset convergence condition

FIG. 5

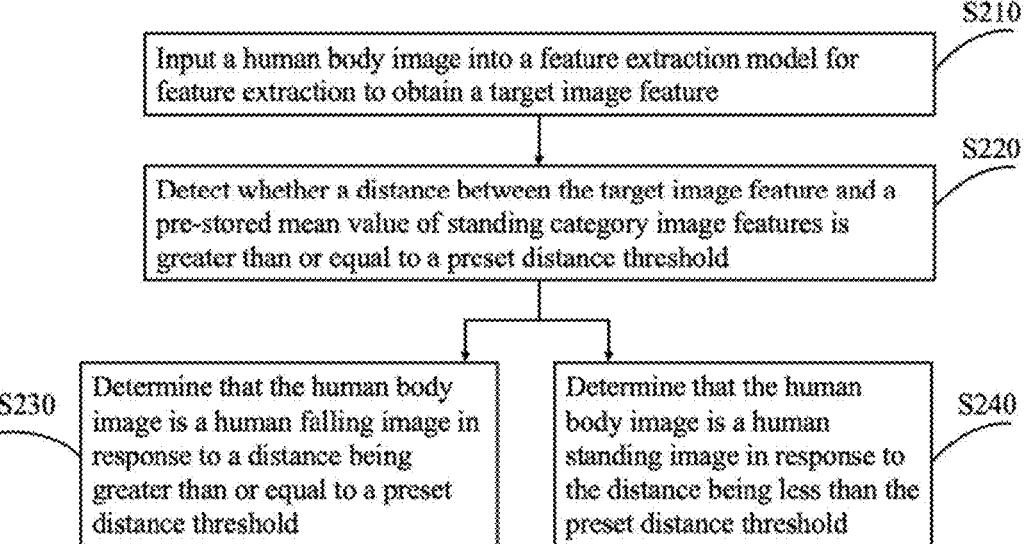

Input a human body image into a feature extraction model for feature extraction to obtain a target image feature — S210

Detect whether a distance between the target image feature and a pre-stored mean value of standing category image features is greater than or equal to a preset distance threshold — S220

S230 — Determine that the human body image is a human falling image in response to a distance being greater than or equal to a preset distance threshold Determine that the human body image is a human standing image in response to the distance being less than the preset distance threshold — S240

FIG. 6

METHOD FOR HUMAN FALL DETECTION AND METHOD FOR OBTAINING FEATURE EXTRACTION MODEL, AND TERMINAL DEVICE

CROSS REFERENCE TO RELATED APPLICATIONS

The present disclosure claims priority to Chinese Patent Application No. 202211263212. X, filed on Oct. 14, 2022, which is incorporated by reference in its entirety.

BACKGROUND

1. Technical Field

The present disclosure relates to image processing technology, and particularly to a method for human fall detection, a method for obtaining feature extraction model for a human body image, and a terminal device.

2. Description of Related Art

Pedestrian fall detection is a classic topic in computer vision, with practical applications in areas such as video surveillance and social security. For instance, deploying pedestrian fall detection systems in care facilities like nursing homes and hospitals allows real-time monitoring of physical conditions of elderly individuals or patients, which can issue timely alerts to caregivers when a fall occurs. Compared to traditional manual care, pedestrian fall detection systems can reduce labor costs of nursing homes and hospitals, while also decreasing the probability of undetected fall of elderly individuals or patients due to caregiver negligence.

However, pedestrian fall detection algorithms often rely on fine-grained human key point detection. This involves locating key points on a human body and establishing rules based on a spatial relationship between these key points to determine if a pedestrian has fallen. In practice, it has been observed that algorithms relying on human key point detection for pedestrian fall detection face two limitations, i.e., inflexible fall detection rules and excessive dependence on accurately detected human key points.

BRIEF DESCRIPTION OF THE DRAWINGS

To describe the technical schemes in the embodiments of the present disclosure more clearly, the following briefly introduces the accompanying drawings required for describing the embodiments. It should be understood that, the accompanying drawings in the following description merely show some embodiments and should not be considered as limiting the scope. For those skilled in the art, other drawings can be obtained according to the drawings without creative efforts.

(a) to (c) in FIG. 1 show several examples of pedestrian image key point detection.

Figure 2:
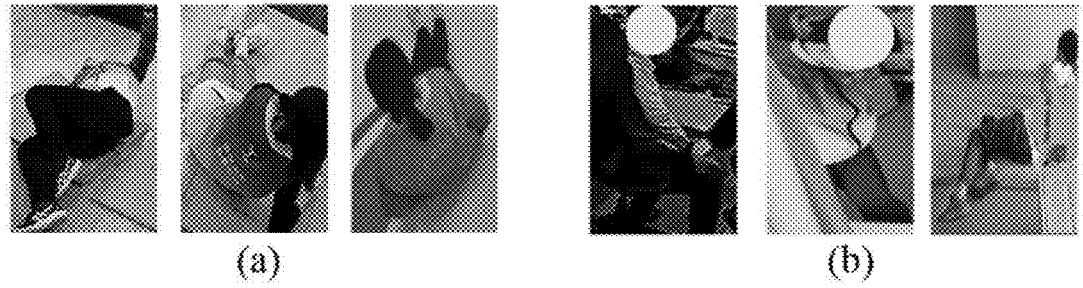

(a) and (b) in FIG. 2 show several examples of occlusion of a pedestrian image.

FIG. 3 is a flowchart of a method for obtaining a feature extraction model for a human body image according to an embodiment of the present disclosure.

Figure 4:
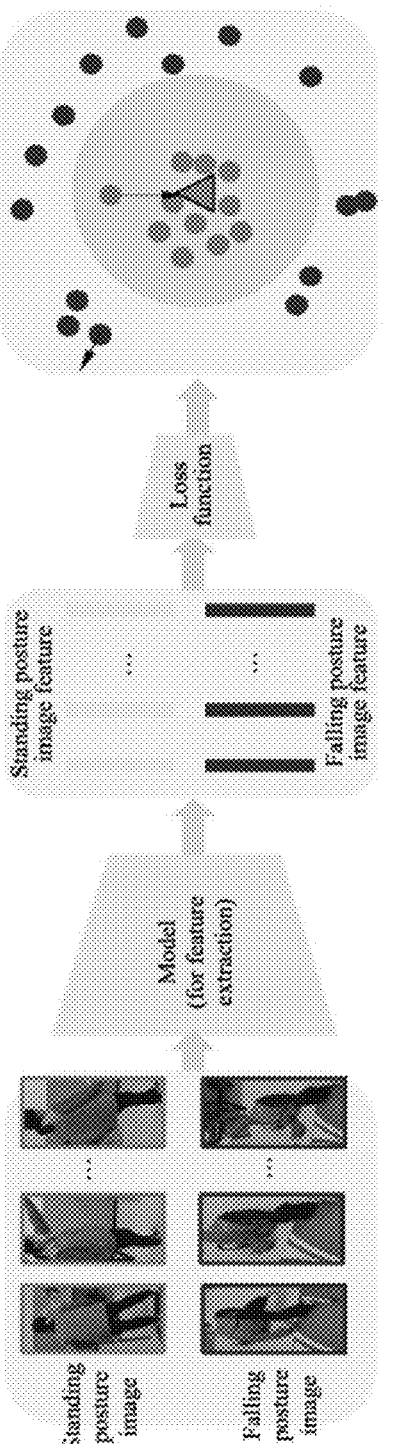

FIG. 4 is a schematic diagram of a network structure of a human fall detection model according to an embodiment of the present disclosure.

FIG. 5 shows a flowchart of calculating a loss value of model training according to an embodiment of the present disclosure.

FIG. 6 is a flowchart of a method for human fall detection according to an embodiment of the present disclosure.

Figure 7:
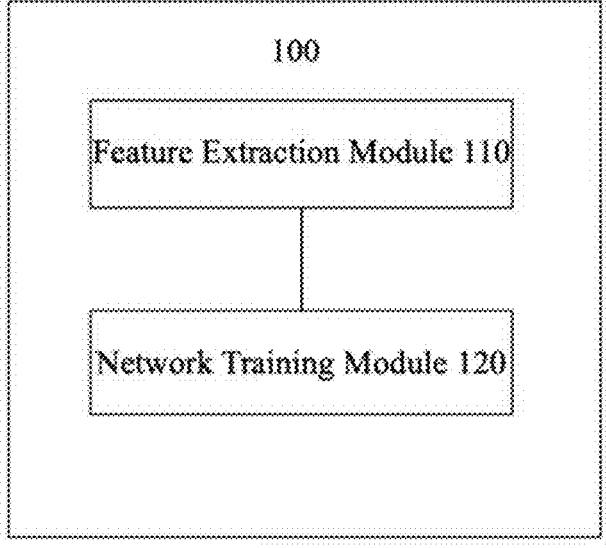

FIG. 7 is a schematic structural diagram of an apparatus for obtaining a feature extraction model for a human body image according to an embodiment of the present disclosure.

Figure 8:
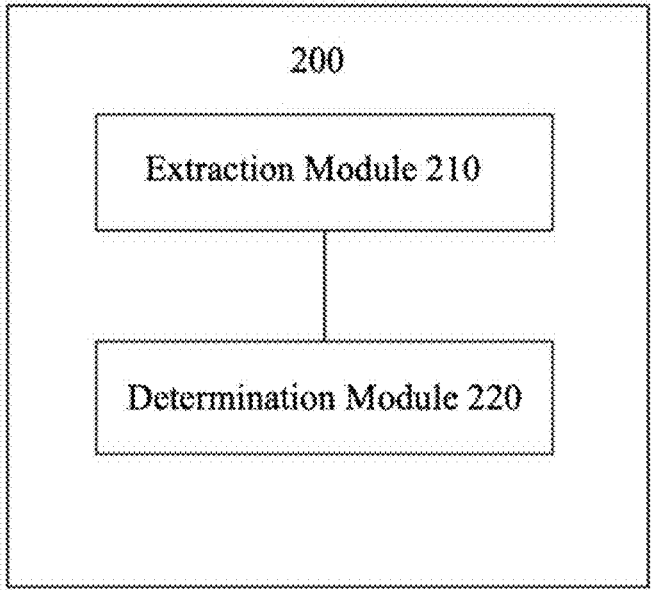

FIG. 8 is a schematic structural diagram of an apparatus for human fall detection according to an embodiment of the present disclosure.

Figure 9:
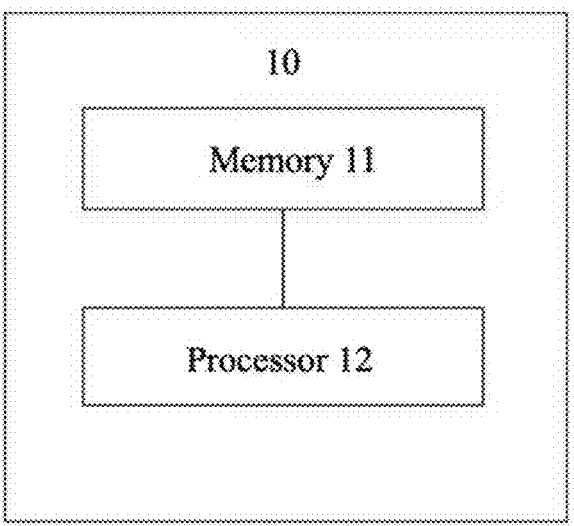

FIG. 9 is a schematic structural diagram of a terminal device according to an embodiment of the present disclosure.

DETAILED DESCRIPTION

The technical solutions in the embodiments of the present disclosure will be clearly and completely described below with reference to the accompanying drawings in the embodiments of the reset disclosure.

Components in the embodiments of the present disclosure, which are generally described and illustrated herein, may be arranged and designed in a variety of different configurations. Therefore, the following detailed description of the embodiments of the present disclosure provided in the accompanying drawings is not intended to limit the scope of the claimed present disclosure, but merely represents a selected embodiment of the present disclosure. Based on the embodiments of the present disclosure, all other embodiments obtained by a person skilled in the art without creative efforts shall fall within the protection scope of the present disclosure.

In the following, the terms 'comprising,' 'including,' 'having,' and their cognates, as used in various embodiments of the present disclosure, are intended to express inclusion of specific features, numbers, steps, operations, elements, components, or combinations thereof. They should not be construed to exclude the presence of one or more other features, numbers, steps, operations, elements, components, or combinations thereof, or exclude the possibility of adding one or more features, numbers, steps, operations, elements, components, or combinations thereof. Additionally, terms such as 'first,' 'second,' 'third,' etc., are used for descriptive purposes only and should not be interpreted as indicating or implying relative importance.

Unless otherwise defined, all terms (including technical and scientific terms) used herein have the same meaning as commonly understood by one of ordinary skill in the art to which various embodiments of the present disclosure belong. The terms, such as terms defined in commonly used dictionaries, will be interpreted as having the same meaning as the context meaning in the relevant technical field and will not be construed as having an idealized meaning or overly formal meaning unless expressly defined in the various embodiments of the present disclosure.

Some embodiments of the present disclosure are described in detail below with reference to the accompanying drawings. In the case of no conflict, the following embodiments and features in the embodiments may be combined with each other.

Figure 1:
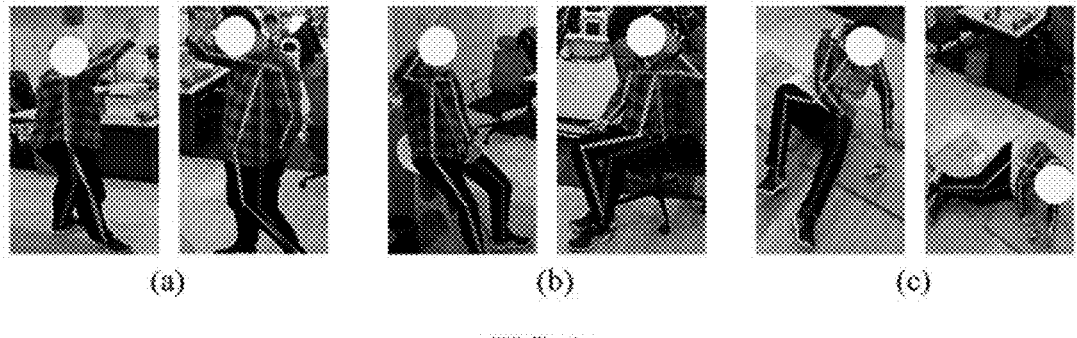

For a conventional pedestrian fall detection method based on human body key point detection, key points at a human body are firstly positioned by using a human body key point detection algorithm. For example, (a), (b) and (c) in FIG. 1 sequentially show a human body's posture in a normal standing state, in a normal sitting state, and in a falling state, and some key points of the human body are positioned. Further, a spatial position relationship between the key points is used to make a rule, so as to determine whether the pedestrian falls. For example, for (c) in FIG. 1, when it is found that a difference between a vertical position of the head and a vertical position of the waist or leg is within a certain range, it is determined that the pedestrian is in a falling state, and the system automatically sends a reminder signal to a caregiver. Similar rules also have 'whether the hip is close to a vertical position of the foots' or the like. However, due to a non-rigid nature of the human body structure, richness of states after the human body falls is often high. In other words, if the human body after a fall is taken as one category, the difference in the category is very large. However, a conventional fall determination rule used by the pedestrian fan detection algorithm based on human body key point detection often only considers several typical fall types, so that the conventional fall determination rule cannot be applied to all fall types in principle.

Moreover, the pedestrian fall detection algorithm based on human body key point detection often needs human body key points with sufficient robustness to determine whether a pedestrian falls. However, as shown in (a) in FIG. 2, in a monitoring scenario, a photographed pedestrian often suffers from serious 'self-occlusion' due to a deployment position and a photographing angle of the camera. That is, the monitoring camera captured that parts of the human body are obscured by themselves, resulting in only certain areas of the human body being visible to the monitoring camera. In addition, as shown in (b) FIG. 2, complexity of indoor environment often causes the human body to be obscured by an object, thereby causing only a part of the human body to be visible. At this point, the human body key point detection algorithm often cannot accurately give the position of the human body key point, thereby affecting accuracy of fall detection.

Therefore, a human fall detection method based on metric learning is provided in the present disclosure, capable of robustly distinguishing between a pedestrian standing posture and a pedestrian falling posture. This method is mainly based on the principle that 'the human body in the standing state shows consistency of the posture, but the human body in the falling state has a great difference in posture'. Specifically, most of the pedestrians' bodies in the standing state are in vertical posture, so that postures of the pedestrians in the standing state captured from different angles are similar. Therefore, an image of the human body in the standing state has good intra-class consistency. As shown in (a) in FIG. 2, compared with the standing posture, postures of the human body in different falling states are very different due to as inherent non-rigid nature of the human body structure. Therefore, the image of the human body in the falling state does not have intra-class consistency.

It should be understood that the pedestrian fall detection method based on metric learning can be applied to various nursing scenes such as hospitals, nursing homes, families and the like, to monitor activity conditions of patients, elderly individuals and the like in real time, and to send a signal to the caregiver in time when a fall is detected. It should be noted that the idea of metric learning provided in the present disclosure may also be used in image recognition tasks in open fields such as pedestrian recognition, face recognition, image retrieval, fine-grained image analysis, etc., and may specifically be adaptively adjusted according to actual requirements.

The following describes the method for human fall detection in detail. In one embodiment, the method is divided into two stages, i.e., a model training stage and a model application stage. Here, the model training stage is described first.

Referring to FIG. 3, exemplarily, the method for obtaining a feature extraction model for a human body image includes the following steps.

S110: inputting sample images with human body posture labels into a feature extraction network for feature extraction to obtain image features. The image features include falling category image features and standing category image features.

It should be understood that the feature extraction network is merely a tool for extracting image features and does not rely on a specific network structure. For example, commonly used deep learning models such as heavyweight networks like ResNet, lightweight networks like MobileNet, ShuffleNet, and the like may be adopted, which are not limited herein.

In one embodiment, postures of the human body are mainly divided into two categories, including a falling category and a standing category. The standing category refers to that the human body is in a standing state (also referred to as a vertical posture), and the falling category refers to that the human body is its a falling state (also referred to as a non-vertical posture).

At the model training stage, sample images of certain data need to be obtained first. All these sample images used for training the feature extraction network are divided into two categories, including a first category of sample images with falling category labels (referred to as falling category sample images) and a second category of sample images with standing category labels (referred to as standing category sample images). For the two categories of sample images, multiple training batches are defined. To ensure robustness of model training, in each training iteration, the number of falling category sample images and the number of standing category sample images can be set to be equal in a training batch.

With respect to S110, as shown in FIG. 4, regarding the falling category sample images (i.e., falling posture images in FIG. 4) and the standing category sample images (i.e., standing posture images in FIG. 4) in one training batch, each sample image is input into a selected feature extraction network for feature extraction to obtain image features of corresponding postures. For example, sample images from the standing category are extracted to obtain standing image features as shown in FIG. 4 and sample images from the falling category are extracted to obtain falling image features as shown in FIG. 4.

S120: training the feature extraction network according to a loss function to obtain a trained feature extraction model and outputting the trained feature extraction model for feature extraction of the human body image. The loss function includes a first loss function item and a second loss function item. The first loss function item is configured to constrain similarity of the standing category image features, and the second loss function item is configured to constrain the standing category image features to aggregate and constrain the falling category image features to separate from the standing category image features.

The loss function is configured to supervise the image features extracted in the feature extraction network. A network parameter is adjusted by calculating the loss value of each training, so that a feature extraction effect of the feature extraction network meets the requirements. As stated above, the human body in the standing state shows the consistency of the posture, but images of the human body in the falling state do not have intra-class consistency. Based on this, the embodiment creatively proposes to respectively constrain the falling category image features and the standing category image features based on metric learning. That is, all the standing category image features are required to be aggregated, and the falling category image features are required to be separated from the standing category image features, in other words, the falling category image features need to be far away from the standing category image features as much as possible. By utilizing the consistency characteristic of the standing category image features to set the constraint on the falling category image features, it is not necessary to exhaustively consider all possible postures during a fall, which also prevents poor detection efficiency of an actual model due to a limited number of training samples for falling postures.

In one embodiment, the first loss function item includes a cross-entropy loss function, and the second loss function item includes a metric learning loss function. The cross-entropy loss function is configured to calculate a cross-entropy loss value of a corresponding image feature and is configured to constrain the similarity between the standing category image features output by the feature extraction network and the input standing category sample images. The metric learning loss function is configured to calculate a metric learning loss value of a corresponding image feature.

For example, an expression of the cross-entropy loss function is as follows:

$$L_{ce} = -\frac{1}{N/2} \sum_{i=1}^{N/2} \log \frac{e^{W_i^T f_i}}{\sum_{j=1}^{2} e^{W_j^T f_i}};$$

where, $L_{ce}$ represents the cross-entropy loss function; N is a number of the sample images, such as a total number of individual training batches or the like; $W_i$ and $W_j$ respectively represent a weight vector of a standing category and a weight vector of a failing category, which can be set according to actual needs or set at any time; $f_i$ represents and $i^{th}$ image feature.

In one embodiment, the metric learning loss function includes a first metric learning loss sub-function and a second metric learning loss sub-function. The first metric learning loss sub-function is configured to a distance between each of the standing category image features and a mean value of the standing category image features to be within a preset range. The second metric learning loss sub-function is configured to constrain a distance between each of the falling category image features and the mean value of the standing category image features to be greater than a preset distance threshold. The preset distance threshold may be correspondingly set according to actual needs, which is not limited herein.

For example, air expression of the first metric learning loss sub function is as follows:

$$L_{me}^A = \frac{1}{N/2} \sum_{i=1}^{N/2} D\left(\overline{f^A}, f_i^A\right);$$

where, $$L_{me}^A$$

represents the first metric learning loss sub-function, and N is the number of the sample images $$D\left(\overline{f_i^A}, f_i^B\right)$$

represents a distance between an $i^{th}$ falling category image feature $$f_i^B$$

and a mean value $\overline{f^A}$ of the standing category image features. The mean value of the above-mentioned standing category image features is obtained by adding each standing category image feature in one training batch or in a plurality of training batches and then calculating the mean value, For example, taking one training batch as an example, an expression of the calculation formula of the mean value is as follows:

$$\overline{f^A} = \frac{1}{N/2} \sum_{i=1}^{N/2} f_i^A;$$

where, $$f_i^A$$

represents the $i^{th}$ standing category image feature.

For example, an expression of the second metric learning loss sub-function is as follows:

$$L_{me}^B = \frac{1}{N/2} \sum_{i=1}^{N/2} \max\left\{\alpha - D\left(\overline{f^A}, f_i^B\right), 0\right\};$$

where, $$L_{me}^B$$

represents the second metric learning loss sub-function, and $\alpha$ is the preset distance threshold.

It should be noted that the N sample images includes N/2 standing category sample images and N/2 falling category sample images.

It should be understood that the expressions of the above-mentioned loss functions are merely examples. In actual use, in addition to constructing based on the above constraint conditions, other constraint conditions may be added on the basis of the above constraint conditions to further define construction of the loss function, which is not limited herein.

As shown in FIG. 5, for S120, training the feature extraction network according to the loss function includes the following steps.

S121: calculating a cross-entropy loss value of the standing category image features through the cross-entropy loss function.

For each standing category sample image, the cross-entropy loss value of the standing category image feature is calculated according to a preset weight of the standing category and the extracted standing category image features through the cross-entropy loss function.

S122: calculating a metric learning loss value of the falling category image features and the standing category image features through the metric learning loss function.

With the first metric learning loss sub-function and the second metric learning loss sub-function as described in the above example, corresponding metric learning loss values may be calculated respectively.

S123: taking a sum of the cross-entropy loss value and the metric learning loss value as a total loss value.

S124: updating a network parameter of the feature extraction network by using the total loss value, until the updated feature extraction network meets a preset convergence condition.

For a single training batch, whether the feature extraction network satisfies a preset convergence condition may be determined by using the calculated total loss value of this training batch. In response to determining that the feature extraction network does not satisfy the preset convergence condition, the training is continued. In response to determining that the feature extraction network satisfies the preset convergence condition, the training is stopped. Specifically, for each training, the network parameter of the feature extraction network is adjusted on the basis of the total loss value of this training to obtain an updated feature extraction network. If the image features extracted by the updated feature extraction network meet requirements, it is determined that the feature extraction network has been well-trained when the calculated loss value, after multiple times of training, is within a preset range. It should be understood that the trained feature extraction network is able to be used to extract required human body image features. For the preset convergence condition, for example, the total loss value may be small enough, such as, approaching 0 or within a certain range, which is not limited herein.

Based on the well-trained feature extraction network, the model application stage will be described. Images of the human body in various standing postures in a required application scenario are collected, and the well-trained feature extraction network in the model training phase is subsequently employed to extract image features.

Referring to FIG. 6, based on the method for obtaining the feature extraction model according to the above embodiments, a method for human fall detection is provided in the embodiments of the present disclosure. The method for human fall detection includes the following steps.

S210: inputting a human body image into a feature extraction model obtained according to the above method for feature extraction to obtain a target image feature (denoted as, $f$).

S220: detecting whether a distance between the target image feature and a pre-stored mean value of standing category image features is greater than or equal to a preset distance threshold.

In response to a distance between the target image feature and a pre-stored mean value of standing category image features being greater than or equal to a preset distance threshold, S230 is performed. In response to the distance between the target image feature and the pre-stored mean value of standing category image features being less than the preset distance threshold, S240 is performed.

For the mean value of the standing, category image features, feature extraction is performed in advance on images of the human body in several standing postures in the corresponding application scenario by using the trained feature extraction model obtained through the method in the above embodiments and then mean value calculation is performed according to the extracted standing category image features, so as to obtain the mean value (denoted as $\bar{f}$) of the standing category image features. Alternatively, images of different human bodies may also be obtained to calculate a mean value of the standing category image features, so as to further improve cross-scene capability of the algorithm.

S230: in response to the distance being greater than or equal to a preset distance threshold, determining that the human body image is a human falling image.

S240: in response to the distance being less than the preset distance threshold, determining that the human body image is a human standing image.

Exemplarily, the distance between the two feature vectors $\bar{f}$ and $f$ is calculated, and it is determined that the human body image is a falling category image in response to the distance being greater than or equal to the preset distance threshold $\alpha$, that is, it is indicated that the human body falls. Optionally, appropriate persons may be notified. On the contrary, it is determined that the human body image is a standing category image in response to the distance being less than the preset distance threshold $\alpha$, that is, it is indicated that the human body image is in the standing state and does not fall.

The method for human fall detection provided in the present disclosure gets rid of the dependence of a conventional pedestrian fall detection algorithm on human body key points. In the model training stage, it is proposed to use metric learning to constrain the standing category image features to aggregate as match as possible and to constrain the falling category image features to be far away from the standing category image features as much as possible, so as to obtain the feature extraction model through training. Further, in the model application stage, the trained model is used to directly extracting the features of the pedestrian images to determine whether the human body in the picture is in a falling state, so that whether the pedestrian falls is determined robustly and quickly, and the problem of difficulty in fall detection due to limitation of the deployment position of the monitoring camera, shielding of the human body and the like is well solved.

Referring to FIG. 7, based on the method for obtaining the feature extraction model according to the above embodiments, an apparatus 100 for obtaining the feature extraction model for the human body image is provided in the embodiments of the present disclosure, including a feature extraction module 110 and a network training module 120.

The feature extraction module 110 is configured to input sample images with human body posture labels into a feature extraction network for feature extraction to obtain image features. The image features include falling category image features and standing category image features.

The network training module 120 is configured to train the feature extraction network according to a loss function to obtain a trained feature extraction model and output the trained feature extraction model for feature extraction of the human body image. The loss function includes a first loss function item and a second loss function item. The first loss function item is configured to constrain similarity of the standing category image features, and the second loss function item is configured to constrain the standing category image features to aggregate and constrain the falling category image features to separate from the standing category image features.

Furthermore, the first loss function item includes a cross-entropy loss function, and the second loss function item includes a metric learning loss function. The network training module 120 includes a loss value calculation submodule and a parameter updating submodule.

The loss value calculation submodule is configured to calculate a cross-entropy loss value of the standing category image features through the cross-entropy loss function, calculate a metric learning loss value of the falling category image features and the standing category image features through the metric learning loss function, and take a sum of the cross-entropy loss value and the metric learning loss value as a total loss value. The parameter updating submodule is configured to update a network parameter of the feature extraction network by using the total loss value, until the updated feature extraction network meets a preset convergence condition.

It should be understood that the apparatus in this embodiment corresponds to the method for obtaining the feature extraction model for the human body image in the above embodiments, and the alternatives in the above embodiments are also applicable to the present embodiment, which are not repeated herein.

Referring to FIG. 8, based on the method for human fall detection according to the above embodiments, an apparatus device 200 for human fall detection is provided in the embodiments of the present disclosure, including an extraction module 210 and a determination module 220.

The extraction module 210 is configured to input a human body image into the above feature extraction model for feature extraction to obtain a target image feature.

The determining module 220 is configured to determine that the human body image is a human falling image in response to a distance between the target image feature and a pre-stored mean value of standing category image features being greater than or equal to a preset distance threshold, and determine that the human body image is a human standing image in response to the distance between the target image feature and the pre-stored mean value of standing category image features being less than the preset distance threshold.

It should be understood that the apparatus in this embodiment corresponds to the method for human fall detection in the above embodiments and the alternatives in the above embodiments are also applicable to the present embodiment, which are not repeated herein.

FIG. 9 is a schematic structural diagram of a terminal device 10 according to an embodiment of the present disclosure. For example, the terminal device 10 includes a fixed-mounted device, such as an indoor camera device, or a mobile device, such as a movable accompanying robot. If the terminal device 10 is a robot, a specific shape thereof is not limited. Exemplarily, the terminal device 10 includes a memory 11 and a processor 12. The memory 11 stores a computer program, and the processor 12 is configured to execute the computer program to implement the method for obtaining the feature extraction model for the human body image or the method for human fall detection according to the embodiments of the present disclosure, so that whether the human falls is determined robustly and quickly.

The memory 11 may be, but is not limited to, a random access memory (RAM), a read-only memory (ROM), a programmable read-only memory (PROM), an erasable programmable read-only memory (EPROM), an electrically erasable programmable read-only memory (EEPROM), etc. The memory 11 is configured to store the computer program, and the processor 12 correspondingly executes the computer program after receiving an execution instruction.

The processor 12 includes an integrated circuit chip having a signal processing capability. The processor 12 may be a general-purpose processor, including at least one of a central processing unit (CPU), a graphics processing unit (GPU), and a network processor (NP), a digital signal processor (DSP), an application specific integrated circuit (ASIC), a field programmable gate array (FPGA), other programmable logic devices, discrete gates or transistor logic devices, and discrete hardware components. The general-purpose processor may be a microprocessor or the processor may be any conventional processor or the like, which is able to implement or perform methods, steps, and logical block diagrams disclosed in the embodiments of the present disclosure.

In this embodiment, the processor 12 may be an integrated circuit chip having a signal processing capability. The processor 12 may be a general-purpose processor, including at least one of a central processing unit (CPU), a graphics processing unit (GPU), and a network processor (NP), a digital signal processor (DSP), an application specific integrated circuit (ASIC), a field programmable gate array (FPGA), or other programmable logic devices, discrete gates or transistor logic devices, and discrete hardware components. The general-purpose processor may be a microprocessor or the processor may be any conventional processor or the like, and may implement or perform the methods, steps, and logical block diagrams disclosed in the embodiments of the present disclosure.

The present application further provides a non-transitory readable storage medium, configured to store the computer program used in the terminal device.

In the several embodiments provided in the present disclosure, it should be understood that the disclosed apparatus/device and method may also be implemented in other manners. The apparatus/device embodiments described above are merely illustrative, for example, the flowcharts and structural diagrams in the drawings illustrate the architecture, functionality, and operation of possible implementations of apparatuses, methods, and computer program products according to various embodiments of the present disclosure. In this regard, each block in the flowchart or block diagrams may represent a module, segment, or portion of code that includes one or more executable instructions for implementing specified logical functions. It should also be noted that, in an alternative implementation, the functions noted in the block may occur out of the order noted in the accompanying drawings. For example, two blocks shown in succession may, in fact, be executed substantially in parallel, which may sometimes be executed in a reverse order, depending upon the functions involved. It should also be noted that each block in the structural diagrams anchor flowchart, and combinations of blocks in the structural diagrams and/or flowchart, may be implemented with dedicated hardware-based systems that perform specified functions or acts, or may be implemented in combinations of special purpose hardware and computer instructions.

In addition, the functional modules or units in the embodiments of the present disclosure may be integrated together to form an independent portion, or each of the modules may exist alone, or two or more modules may be integrated to form an independent portion.

When the functions are implemented in the form of a software functional module and sold or used as an independent product, the functions may be stored in a non-transitory computer-readable storage medium. Based on such understanding, the technical solutions of the present disclosure may be embodied in the form of a software product in essence, or the part that contributes to the prior art or a portion of the technical solution may be embodied in the form of a software product. The computer software product is stored in a non-transitory storage medium and includes several instructions for enabling a computer device (which may be a smart phone, a personal computer, a server, or a network device, etc.) to perform all or some of the processes in the methods described in the embodiments of the present disclosure. The above storage medium includes various media that can store program codes, such as a USB flash disk, a mobile hard disk, a read-only memory (ROM), a random access memory (RAM), a magnetic disk, or an optical disc.

The above embodiments are merely intended for describing technical solutions of the present disclosure. However, the protection scope of the present disclosure is not limited thereto, and any person skilled in the art could easily conceive changes or substitutions within the technical scope disclosed in the present disclosure, all of which should be covered within the protection scope of the present disclosure.

What is claimed is:

1. A method for obtaining a feature extraction model for a human body image, comprising:

inputting sample images with human body posture labels into a feature extraction network for feature extraction to obtain image features, wherein the image features include falling category image features and standing category image features; and training the feature extraction network according to a loss function to obtain a trained feature extraction model and outputting the trained feature extraction model for feature extraction of the human body image;

wherein the loss function includes a first loss function item and a second loss function item, and wherein the first loss function item includes a cross-entropy loss function and is configured to constrain similarity of the standing category image features, and the second loss function item includes a metric learning loss function and is configured to constrain the standing category image features to aggregate and constrain the falling category image features to separate from the standing category image features; and wherein the constraining the standing category image features to aggregate and constraining the falling category image features to separate from the standing category image features includes:

constraining a distance between each of the standing category image features and a mean value of the standing category image features to be within a preset range; and constraining a distance between each of the falling category image features and the mean value to be greater than a preset distance threshold.

2. The method according to claim 1, wherein the training the feature extraction network according to the loss function includes:

calculating a cross-entropy loss value of the standing category image features through the cross-entropy loss function;

calculating a metric learning loss value of the falling category image features and the standing category image features through the metric learning loss function;

taking a sum of the cross-entropy loss value and the metric learning loss value as a total loss value; and updating a network parameter of the feature extraction network by using the total loss value, until the updated feature extraction network meets a preset convergence condition.

3. The method according to claim 2, wherein the metric learning loss function includes a first metric learning loss sub-function and a second metric learning loss sub-function; and wherein expressions of the first metric learning loss sub-function and the second metric learning loss sub-function are respectively as follows:

$$L_{me}^A = \frac{1}{N/2} \sum_{i=1}^{N/2} D\left(\overline{f^A}, f_i^A\right);$$

$$L_{me}^B = \frac{1}{N/2} \sum_{i=1}^{N/2} \max\left\{\alpha - D\left(\overline{f^A}, f_i^B\right), 0\right\};$$

wherein $$L_{me}^A \text{ and } L_{me}^B$$

respectively represent the first metric learning loss sub-function and the second metric learning loss sub-function, N is a number of the sample images, $$D\left(\overline{f_i^A}, f_i^B\right)$$

represents a distance between an $i^{th}$ falling category image feature $$f_i^B$$

and a mean value $\overline{f^A}$ of the standing category image features, and $\alpha$ is the preset distance threshold.

4. The method according to claim 2, wherein an expression of the cross-entropy loss function is as follows:

$$L_{ce} = -\frac{1}{N/2} \sum_{i=1}^{N/2} \log \frac{e^{W_i^T f_i}}{\sum_{j=1}^{2} e^{W_j^T f_i}};$$

wherein $L_{ce}$ represents the cross-entropy loss function, N is a number of the sample images, $W_i$ and $W_j$ respectively represent a weight vector of a standing category and a weight vector of a falling category, and $f_i$ represents an $i^{th}$ image feature.

5. The method according to claim 1, wherein before the inputting the sample images with the human body posture labels into the feature extraction network for feature extraction, the method further comprises:

constructing a plurality of training batches, each training batches including a plurality of standing category sample images and a plurality of falling category sample images with the same number.

6. The method according to claim 1, wherein the feature extraction network includes at least one of ResNet, Mobile-Net, or ShuffleNet.

7. A method for human fall detection, comprising:

inputting a human body image into a feature extraction model for feature extraction to obtain a target image feature;

in response to a distance between the target image feature and a pre-stored mean value of standing category image features being greater than or equal to a preset distance threshold, determining that the human body image is a human falling image; and in response to the distance between the target image feature and the pre-stored mean value of standing category image features being less than the preset distance threshold, determining that the human body image is a human standing image;

wherein a method for obtaining the feature extraction model includes:

inputting sample images with human body posture labels into a feature extraction network for feature extraction to obtain image features, wherein the image features include falling category image features and standing category image features; and training the feature extraction network according to a loss function to obtain a trained feature extraction model and outputting the trained feature extraction model for feature extraction of the human body image;

wherein the loss function includes a first loss function item and a second loss function item, and wherein the first loss function item includes a cross-entropy loss function and is configured to constrain similarity of the standing category image features, and the second loss function item includes a metric learning loss function and is configured to constrain the standing category image features to aggregate and constrain the falling category image features to separate from the standing category image features; and wherein the constraining the standing category image features to aggregate and constraining the falling category image features to separate from the standing category image features includes:

constraining a distance between each of the standing category image features and a mean value of the standing category image features to be within a preset range; and constraining a distance between each of the falling category image features and the mean value to be greater than a preset distance threshold.

8. The method according to claim 7, wherein the training the feature extraction network according to the loss function includes:

calculating a cross-entropy loss value of the standing category image features through the cross-entropy loss function;

calculating a metric learning loss value of the falling category image features and the standing category image features through the metric learning loss function;

taking a sum of the cross-entropy loss value and the metric learning loss value as a total loss value; and updating a network parameter of the feature extraction network by using the total loss value, until the updated feature extraction network meets a preset convergence condition.

9. The method according to claim 8, wherein the metric learning loss function includes a first metric learning loss sub-function and a second metric learning loss sub-function; and wherein expressions of the first metric learning loss sub-function and the second metric learning loss sub-function are respectively as follows:

$$L_{me}^{A} = \frac{1}{N/2} \sum_{i=1}^{N/2} D\left(\overline{f^{A}}, f_{i}^{A}\right);$$

$$L_{me}^{B} = \frac{1}{N/2} \sum_{i=1}^{N/2} \max\left\{\alpha - D\left(\overline{f^{A}}, f_{i}^{B}\right), 0\right\};$$

wherein $$L_{me}^{A} \text{ and } L_{me}^{B}$$

respectively represent the first metric learning loss sub-function and the second metric learning loss sub-function, N is a number of the sample images, $$D\left(\overline{f_{i}^{A}}, f_{i}^{B}\right)$$

represents a distance between an $i^{th}$ falling category image feature $$f_{i}^{B}$$

and a mean value $\overline{f^{A}}$ of the standing category image features, and α is the preset distance threshold.

10. The method according to claim 8, wherein an expression of the cross-entropy loss function is as follows:

$$L_{ce} = -\frac{1}{N/2} \sum_{i=1}^{N/2} \log \frac{e^{W_{i}^{T} f_{i}}}{\sum_{j=1}^{2} e^{W_{j}^{T} f_{i}}};$$

wherein $L_{ce}$ represents the cross-entropy loss function, N is a number of the sample images, $W_{i}$ and $W_{j}$ respectively represent a weight vector of a standing category and a weight vector of a falling category, and $f_{i}$ represents an $i^{th}$ image feature.

11. The method according to claim 7, wherein before the inputting the sample images with the human body posture labels into the feature extraction network for feature extraction, the method further comprises:

constructing a plurality of training batches, each training batches including a plurality of standing category sample images and a plurality of falling category sample images with the same number.

12. The method according to claim 7, wherein the feature extraction network includes at least one of ResNet, Mobile-Net, or ShuffleNet.

13. A terminal device comprising a processor and a memory, wherein the memory stores a computer program, and the processor is configured to execute the computer program to perform a method for obtaining a feature extraction model for a human body image; and wherein the method includes:

inputting sample images with human body posture labels into a feature extraction network for feature extraction to obtain image features, wherein the image features include falling category image features and standing category image features; and training the feature extraction network according to a loss function to obtain a trained feature extraction model and outputting the trained feature extraction model for feature extraction of the human body image;

wherein the loss function includes a first loss function item and a second loss function item, and wherein the first loss function item includes a cross-entropy loss function and is configured to constrain similarity of the standing category image features, and the second loss function item includes a metric learning loss function and is configured to constrain the standing category image features to aggregate and constrain the falling category image features to separate from the standing category image features; and wherein the constraining the standing category image features to aggregate and constraining the falling category image features to separate from the standing category image features includes:

constraining a distance between each of the standing category image features and a mean value of the standing category image features to be within a preset range; and constraining a distance between each of the falling category image features and the mean value to be greater than a preset distance threshold.

14. The terminal device according to claim 13, wherein the training the feature extraction network according to the loss function includes:

calculating a cross-entropy loss value of the standing category image features through the cross-entropy loss function;

calculating a metric learning loss value of the falling category image features and the standing category image features through the metric learning loss function;

taking a sum of the cross-entropy loss value and the metric learning loss value as a total loss value; and updating a network parameter of the feature extraction network by using the total loss value, until the updated feature extraction network meets a preset convergence condition.

15. The terminal device according to claim 14, wherein the metric learning loss function includes a first metric learning loss sub-function and a second metric learning loss sub-function; and wherein expressions of the first metric learning loss sub-function and the second metric learning loss sub-function are respectively as follows:

$$L_{me}^A = \frac{1}{N/2} \sum_{i=1}^{N/2} D\left(\overline{f^A}, f_i^A\right);$$

$$L_{me}^B = \frac{1}{N/2} \sum_{i=1}^{N/2} \max\left\{\alpha - D\left(\overline{f^A}, f_i^B\right), 0\right\};$$

wherein $$L_{me}^A \text{ and } L_{me}^B$$

respectively represent the first metric learning loss sub-function and the second metric learning loss sub-function, N is a number of the sample images, $$D\left(\overline{f_i^A}, f_i^B\right)$$

represents a distance between an $i^{th}$ falling category image feature $$f_i^B$$

and a mean value $\overline{f^A}$ of the standing category image features, and $\alpha$ is the preset distance threshold.

16. The terminal device according to claim 14, wherein an expression of the cross-entropy loss function is as follows:

$$L_{ce} = -\frac{1}{N/2} \sum_{i=1}^{N/2} \log \frac{e^{W_i^T f_i}}{\sum_{j=1}^{2} e^{W_j^T f_i}};$$

wherein $L_{ce}$ represents the cross-entropy loss function, N is a number of the sample images, $W_i$ and $W_j$ respectively represent a weight vector of a standing category and a weight vector of a falling category, and $f_i$ represents an $i^{th}$ image feature.

17. The terminal device according to claim 13, wherein before the inputting the sample images with the human body posture labels into the feature extraction network for feature extraction, the method further comprises:

constructing a plurality of training batches, each training batches including a plurality of standing category sample images and a plurality of falling category sample images with the same number.

18. The terminal device according to claim 17, wherein the mean value is obtained by calculating an average of each standing category image feature in the plurality of training batches.

19. The terminal device according to claim 13, wherein the mean value is obtained by calculating an average of each standing category image feature in one training batch.

* * * * *